UNITED STATES PATENT OFFICE.

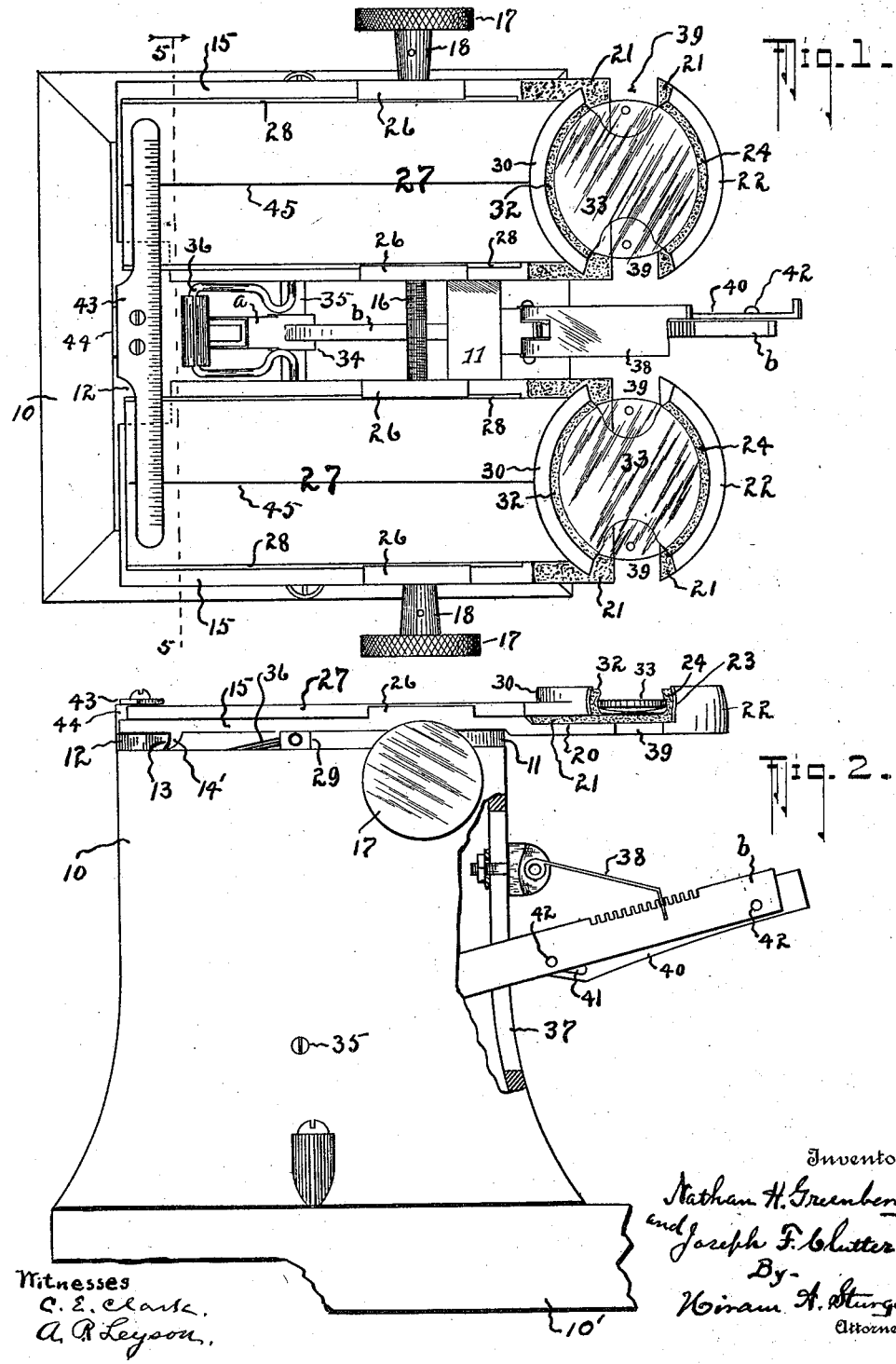

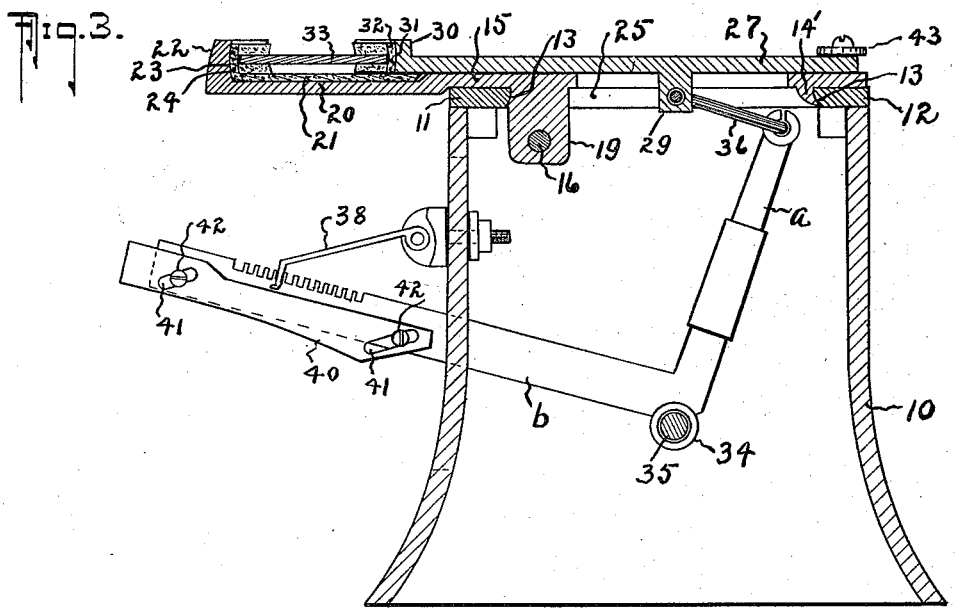
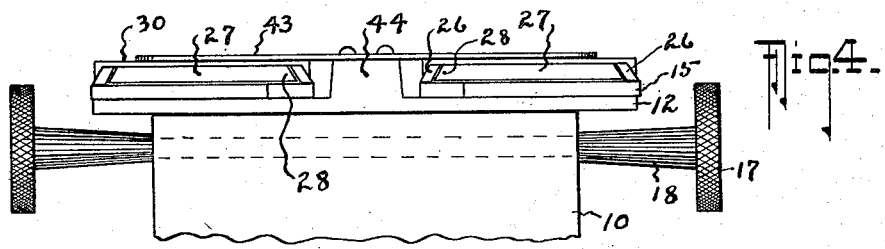
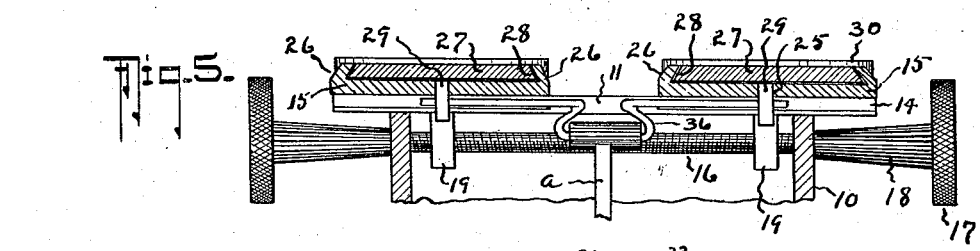
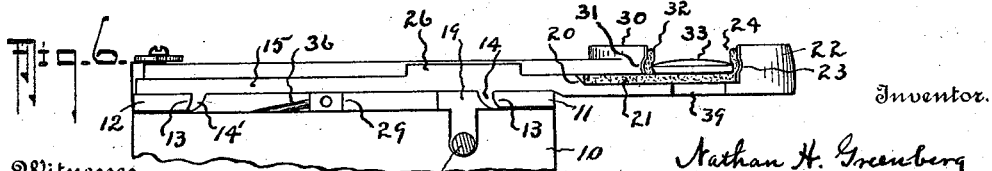

NATHAN H. GREENBERG AND JOSEPH F. CLUTTER, OF OMAHA, NEBRASKA.

ASSEMBLER FOR RIMLESS LENSES.

1,142,956.   Specification of Letters Patent.   Patented June 15, 1915.

Application filed February 11, 1915. Serial No. 7,634.

*To all whom it may concern:*

Be it known that we, NATHAN H. GREENBERG and JOSEPH F. CLUTTER, citizens of the United States, residing at Omaha, in the county of Douglas and State of Nebraska, have invented certain new and useful Improvements in Assemblers for Rimless Lenses, of which the following is a specification.

This invention relates to an assembler for rimless lenses, and has for its object to provide an apparatus found to be particularly useful for opticians when securing the metallic nose-pieces and temple pieces to the lenses, since it saves the time of an operator and tends to prevent fracture or breakage.

The invention has reference, broadly, to the provision of a pair of holders, by means of which the lenses may be firmly and resiliently supported while the metallic parts are being applied or mounted, means for releasing the lenses readily, and means for lateral adjustments of the holders so that the pupilary distance for the lenses may be correct.

With the foregoing objects in view and others to be mentioned, the invention presents a novel and useful construction, combination and arrangement of parts as described herein and claimed, and as illustrated in the accompanying drawing, wherein,—

Figure 1 is a plan view of the apparatus. Fig. 2 is a partly broken view of the same in side elevation. Fig. 3 is a view in longitudinal section through the base or casing and through the longitudinal middle of one of the pairs of plates or holders. Figs. 4, 5 and 6 are detail views to clearly show construction. Fig. 4 is a rear view showing the upper part of the apparatus. Fig. 5 is a sectional view on line 5 5 of Fig. 1, the lower part of the apparatus being broken away. Fig. 6 is a side view showing the upper part of the apparatus, the disk for the screw-rod being broken away.

Referring now to the drawing for a more particular description, numeral 10 indicates a suitable support or base which may be of any desired form or construction, the construction herein shown and preferred being an upright hollow casting or casing, rectangular in cross-section with outwardly flaring walls near their lower ends which may be conveniently secured upon a bench or table 10' so that it will be maintained in a stationary position.

Numerals 11 and 12 indicate a pair of parallel strips secured upon the top of the casing, respectively, near its front and back to operate as guides. Their inner sides or edges are beveled as indicated at 13 for coöperative engagement with the inclined flanges 14 and 14' which project below the supporting plates 15.

At 16 is indicated a reversely threaded screw which traverses the sides near the front of the casing, its ends, outwardly of the casing being provided with disks or heads 17 for manual use in operating said screw, any end thrust of the screw being prevented by the sleeves 18 with which the disks are provided and which bear against the sides of the casing.

Each supporting-plate 15 is provided midway between its edges and near the front of the casing with a hanger bracket 19 in which the screw 16 is threaded, and it will be understood that an operator by rotating the screw in one direction may cause plates 15 to move laterally toward each other, and that the rotation of the screw in an opposite direction will cause said plates to move reversely or outwardly from each other. During these movements they will be maintained parallel by operation of the guides 11 and 12 coöperating with flanges 14 and 14'.

Plates 15 having a sufficient length to extend forwardly of the casing a suitable distance so that operation will be convenient for securing the required metallic parts upon the lenses, and the front end of each plate 15 is provided with a recess or depression 20 formed in its upper side and having a sufficient depth for a mounting therein of a cushion 21; and each plate 15 at its front terminal is provided with an upwardly projecting flange 22 having a concaved inner surface conforming generally to the curved upper and lower edges of a lens; also each flange 22 is preferably formed with a transverse curvature to provide a recess 23 opening on its inner side below its upper end, said recess tending to retain the lens, when compressed therein; and a cushion 24 is also mounted in said recess.

Each supporting-plate, midway between its longitudinal edges, is provided with a slot 25 opening on its top and bottom, and which extends from the bracket 19 to the flange 14', and each of said plates, midway between its ends, is provided at its longitudinal edges with a pair of upwardly-projecting, inwardly-inclined lugs 26 to operate as guides for a compression-plate 27. Each plate 27 is provided with beveled, longitudinal edges 28 for engagement with a pair of guides 26, and also with a downwardly projecting lug or guide 29 which may slide in a slot 25. The front end of each plate 27 is also provided with an upset flange 30 having a concaved inner surface conforming generally to the curved upper and lower edges of a lens, and preferably each flange 30 is formed with a transverse curvature to provide a recess 31 opening on its inner side below its upper end, for a mounting therein of a cushion 32, said recess also operating to cause the lenses to be retained when compressed.

Any suitable means may be provided for causing uniform longitudinal movements of plates 27 so that the lenses 33 may be compressed between the flanges 22 and 30, the means herein shown being the rock lever 34 mounted on the shaft 35 with bearings in the sides of the casing, arm $a$ of the rock lever, at its upper end, being provided with the bow spring 36, each of the arms of the bow spring, at its terminal, engaging in a lug or guide 29. The arm $b$ of the rock lever traverses a vertical slot 37 formed in the front wall of the casing, and it will be seen that when this arm is swung downwardly arm $a$ will swing forwardly to compress the spring. Since the mounting of the rock lever is midway between the ends of shaft 35 with its arms $a$ and $b$ disposed in a plane equidistant from the compression-plates and sides of the casing, the resistance or tension of the arms of the spring being equal, plates 27 will have a uniform pressure upon the edges of the lenses, during operation, which of course is desirable. The pair of lenses being disposed on the cushions 21, the operator, after causing a rotation of the screw for disposing the lenses a suitable distance apart, may swing downwardly the arm $b$ of the rock lever until the lenses have been compressed edgewise with a sufficient force to be firmly held between the flanges 22 and 30, a pawl 38, pivotally supported by the casing, catching between the teeth of arm $b$, said arm operating as a rack-bar.

Opposed recesses 39 are formed in and open on the edges of the depressed part of each supporting-plate near its flange 22, so that these forwardly extending plates will not be obtrusive and will permit the metallic parts such as the nose piece or temple pieces (not shown) to bear upon the rimless lenses when secured thereon, small screws being generally used for this purpose.

It will be understood that the lenses should not be compressed with undue force, and if the spring 36 was omitted, this might occur. When arm $b$ of the rock lever is swung downwardly, the lenses being seated on cushions 21, between cushions 24 and 32, said lenses will be compressed edgewise between flanges 22 and 30, the forward movement of the compression-plates 27 being subject to the resistance of the spring, and therefore the lenses will be held by a resilient force tending to prevent breakage or fracture.

At 40 is indicated a releasing plate which may be moved inwardly to cause disengagement of the pawl from the rack bar, inclined slots 41 being formed in the plate, the slots being traversed by the keepers or lugs 42 which are secured to the rack-bar, and after the plate 40 has been moved inwardly and the pawl has been released, the arm or rack bar $b$ may be swung upwardly for moving the compression-plates rearwardly, so that the lenses may be removed.

Numeral 43 indicates a plate mounted upon a projection 44. It is disposed at right angles to and adapted to overhang the compression-plates, preferably at their rear ends. It is provided with suitable indices for use in connection with the rotatable screw-member 16 as a measuring device, to determine the pupilary distance for the lenses, when the latter are held between the flanges 22 and 30.

Numeral 45 indicates a rectilinear depression or line formed in or on the upper face of a compression-plate and which may be visible to an operator when moving the supporting-plates by use of the screw. It is disposed in alinement with the middle or central part of each segment or curved flange 22 or 30, as an aid to said operator in determining the pupilary distance when placing and securing the lenses between the flanges mentioned.

Each supporting-member 15 with its flange 22 may be considered as a detent plate since the flange resists stresses directed thereto by the lens when deposited on said plate above a depression 20. It will be understood that while the construction has been described in details which are specific, and which is preferred, we do not limit ourselves in this respect, nor to the form, size or proportion of material to be employed, the scope of the invention being determined by the appended claims.

We claim:

1. An apparatus for assembling rimless lenses, comprising a base, a pair of elongated detent plates each having a curved part for resisting edgewise stresses of a lens when deposited thereon, means for moving said detent plates transversely while disposed on said base, a pair of elongated compression-plates disposed upon and coincidently movable longitudinally of the detent plates, each being provided with a curved part for directing stresses edgewise of a lens on a detent plate, when moving in one direction.

2. An apparatus for assembling rimless lenses, comprising a base, a pair of elongated detent plates upon and extending forwardly of the base, each having a curved part for resisting edgewise stresses of a lens when deposited thereon and provided with recesses opening on its upper and lower sides adjacent to said curved part, means for moving said detent plates transversely while disposed on said base, a pair of elongated compression-plates disposed upon and coincidently movable longitudinally of the detent plates, means to maintain the compression-plates parallel with the detent plates, each of said compression-plates being provided with a curved part for directing stresses edgewise of a lens on a detent plate while moving in one direction.

3. An apparatus for assembling rimless lenses, comprising a base, a pair of elongated detent plates disposed on the base, each having a curved part for resisting edgewise stresses of a lens when deposited thereon, a double threaded screw rotatable for moving said detent plates transversely, a pair of elongated compression-plates each being disposed upon and movable with a detent plate, means for maintaining the compression-plates parallel with the detent plates, means for coincidently moving the compression-plates longitudinally of the detent plates, each of said compression-plates being provided with a curved part for directing stresses edgewise of the lens on a detent plate when moving in one direction, and a stationary plate bearing indices for determining the transverse movements of said plates.

4. An apparatus for assembling rimless lenses, comprising a base, a pair of elongated detent plates each having a depressed part provided with a cushion for a seating thereon of a lens and having a curved part provided with a cushion for resisting edgewise stresses of a lens, means for moving said detent plates transversely while disposed upon said base, a pair of elongated compression-plates disposed upon and coincidently movable longitudinally of the detent plates, each being provided with a curved part for directing stresses edgewise of a lens on a detent plate when moving in one direction, the curved part of each compression-plate being provided with a cushion for engaging one of the edges of a lens.

5. In an apparatus for assembling rimless lenses, a base, a pair of elongated supporting-plates disposed side by side thereon, each being provided at one of its terminals with a curved flange for resisting stresses to a lens when deposited on a supporting-plate, a rotatable screw-member for coincidently moving the supporting-plates toward or in directions opposed to each other, an elongated compression-plate carried by each supporting-plate and provided at one of its terminals with a curved flange for directing stresses to a lens on a supporting-plate, a spring connected with a compression-plate, a rock lever engaging the spring and adapted to be actuated for moving the compression-plates longitudinally of the supporting plates subject to the resistance of the spring.

6. In an apparatus for assembling rimless lenses, a base, stationary, parallel, rectilinear guides on said base, a pair of elongated supporting-plates engaging and movable at right angles to said guides, each supporting plate being provided with opposed recesses opening on its edges adjacent to one of its terminals and provided outwardly of said recesses with a curved flange for resisting a pressure directed to a lens when deposited on said supporting-plate above said recesses, an elongated compression-plate carried by each supporting-plate and provided at one of its terminals with a curved flange for directing pressure to a lens on a supporting-plate, means for maintaining the compression-plates parallel with the supporting-plates, a spring connected with a compression-plate, a rock lever engaging the spring and adapted to be actuated for moving the compression-plates longitudinally of the supporting-plates subject to the resistance of the spring for causing a pressure of the flange of a compression-plate against a lens on a supporting-plate.

7. In an apparatus for assembling rimless lenses, a base provided with a projection midway between its sides and formed with an elongated, vertical aperture in its front wall, a pair of rectilinear guides mounted on said base, a pair of supporting-plates in engagement with and adapted to be moved coincidently at right angles to said guides, each of said supporting-plates having a curved flange provided with a cushion at one of its terminals for resisting pressure to a lens when disposed to abut thereon. a compression-plate carried by each supporting-plate and provided at one of its terminals with a curved flange and with a cushion abutting on said flange, means for maintaining the compression-plates parallel with the supporting-plates, a spring connected with the supporting plates, a rock lever engaging the spring and having an arm traversing the vertical aperture of said base, said rock lever being movable for moving the compression-plates coincidently toward the flanges of the supporting-plates to press the cushions of their flanges against the lenses on said supporting-plates, and an elongated plate bearing indices, said plate being disposed above and at right angles to the supporting-plates while mounted on the projection of said base.

In testimony whereof, we have affixed our signatures in presence of two witnesses.

NATHAN H. GREENBERG.
JOSEPH F. CLUTTER.

Witnesses:
HIRAM A. STURGES,
ARTHUR H. STURGES.